July 11, 1950

G. W. HARDY 2,515,037

CONTROLLABLE PITCH PROPELLER

Filed Nov. 19, 1945

INVENTOR.
GORDON W. HARDY
BY George M. Soule
ATTORNEY

July 11, 1950

G. W. HARDY 2,515,037

CONTROLLABLE PITCH PROPELLER

Filed Nov. 19, 1945

INVENTOR.
GORDON W. HARDY
BY George M. Soule
ATTORNEY

July 11, 1950 G. W. HARDY 2,515,037
CONTROLLABLE PITCH PROPELLER
Filed Nov. 19, 1945 6 Sheets-Sheet 3
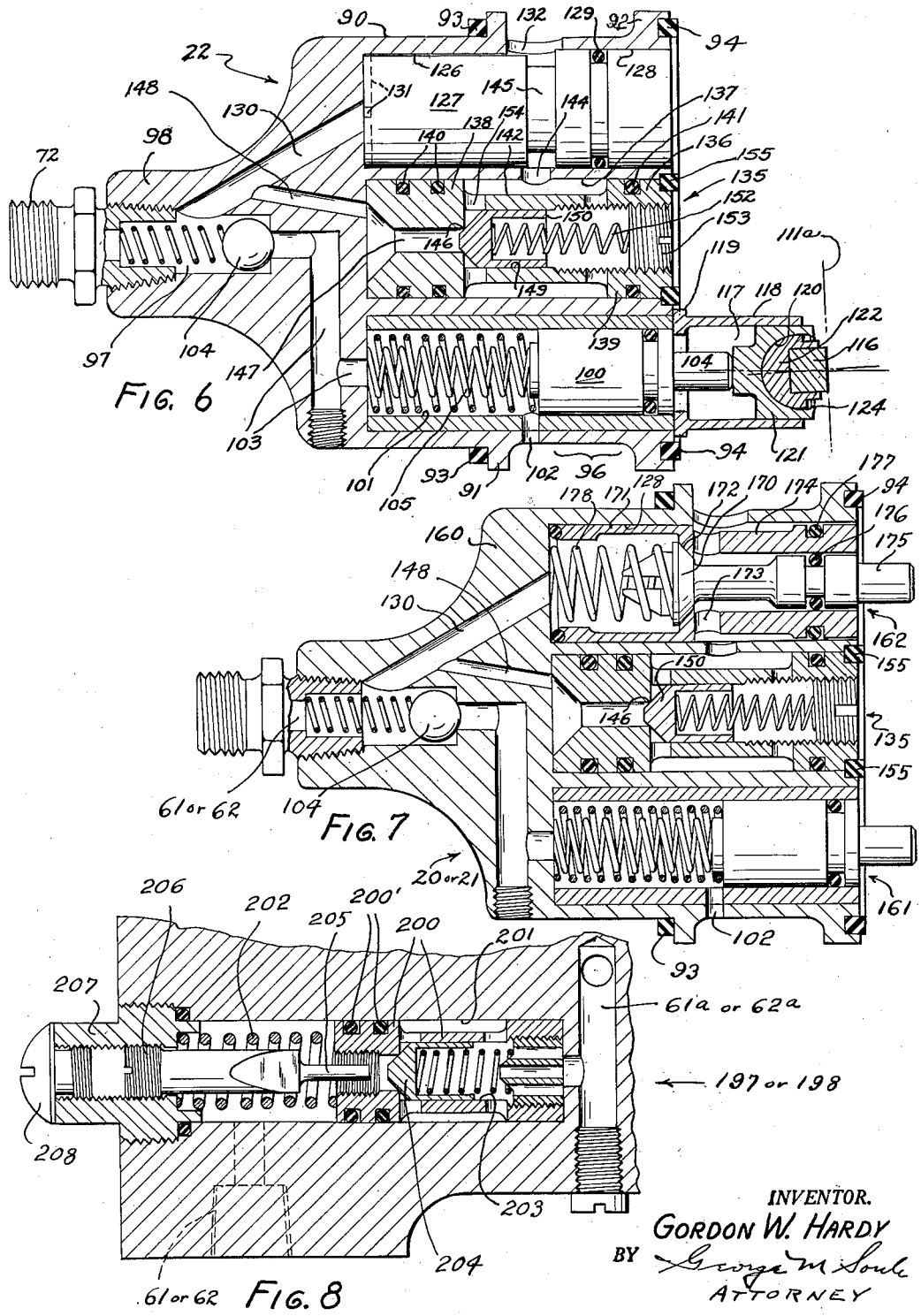
INVENTOR.
GORDON W. HARDY
BY George M Soule
ATTORNEY

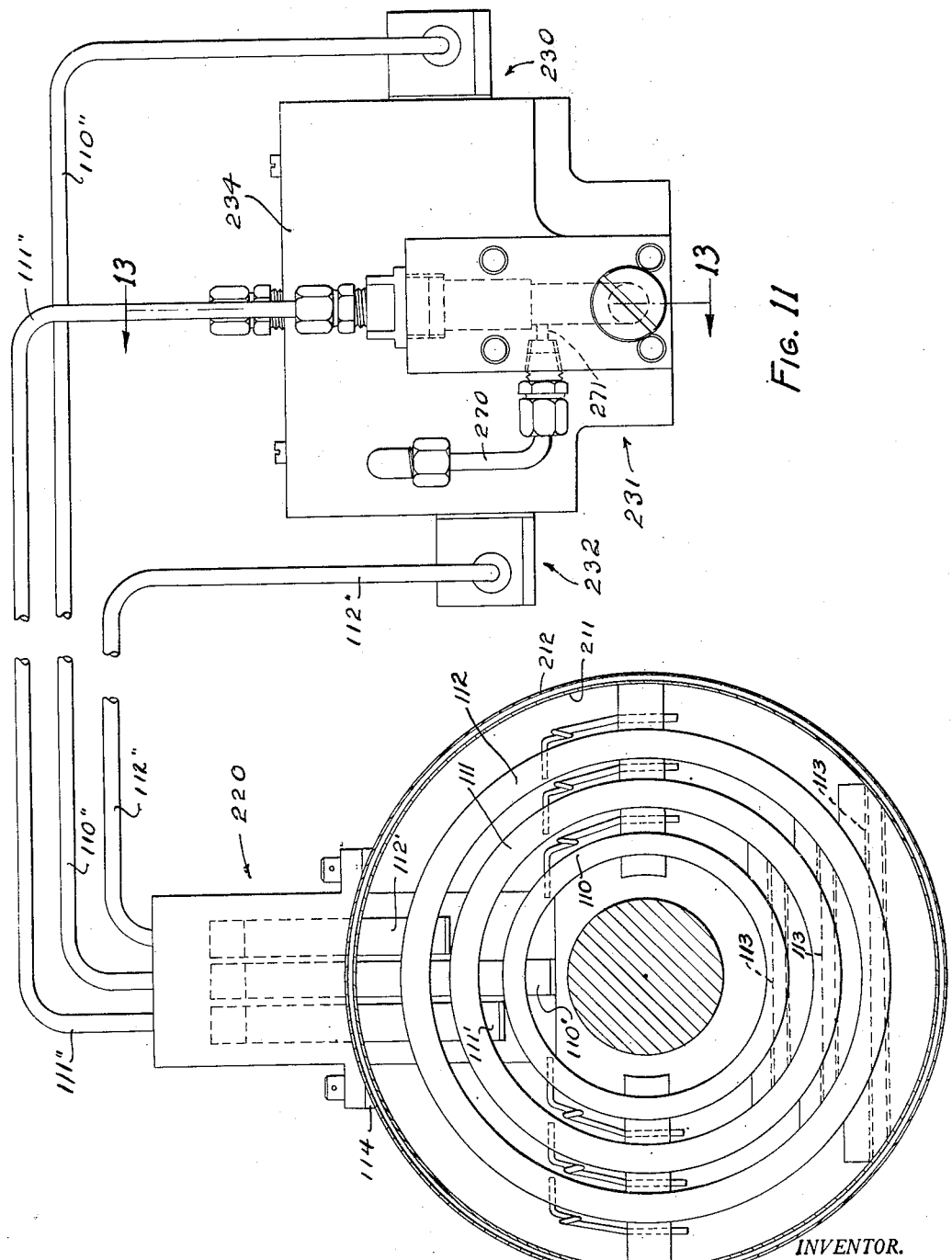

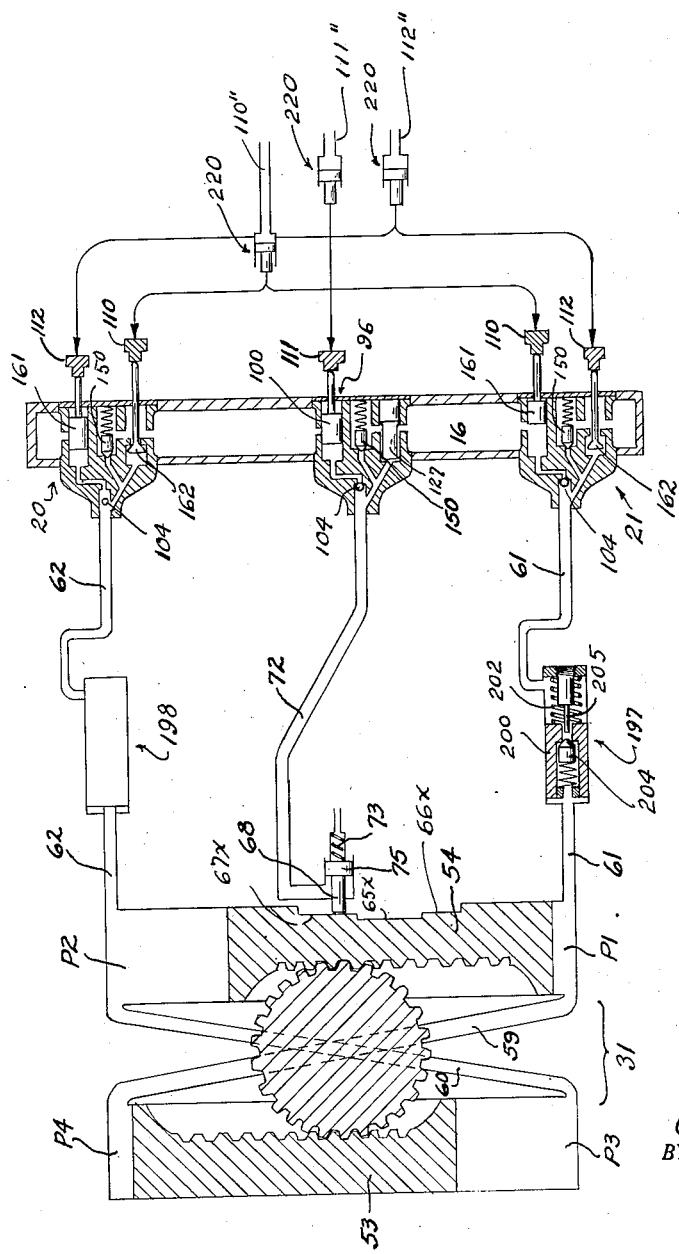

July 11, 1950 G. W. HARDY 2,515,037
CONTROLLABLE PITCH PROPELLER
Filed Nov. 19, 1945 6 Sheets-Sheet 6
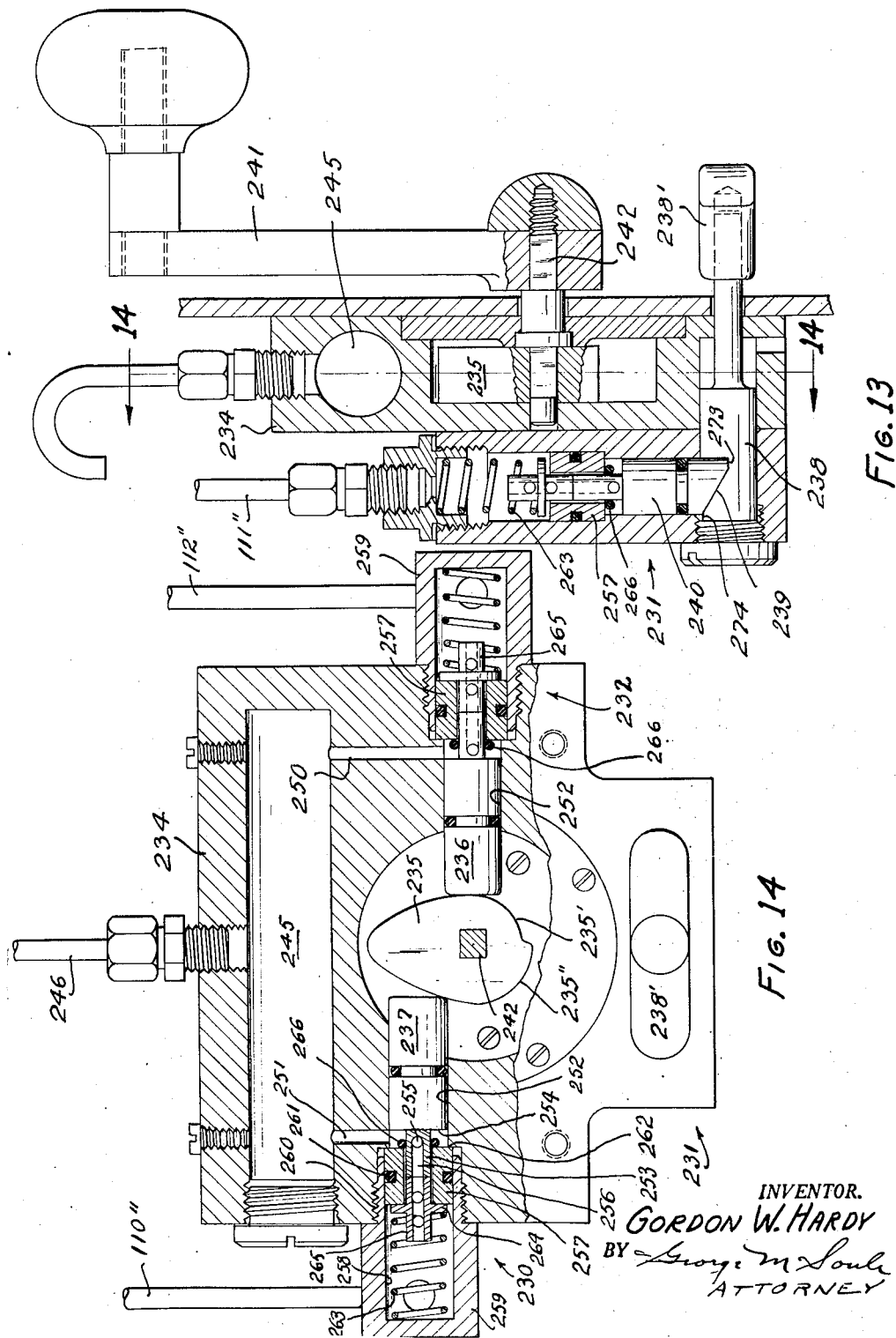
INVENTOR.
GORDON W. HARDY
BY George M. Soule
ATTORNEY Patented July 11, 1950

2,515,037

UNITED STATES PATENT OFFICE 2,515,037

CONTROLLABLE PITCH PROPELLER

Gordon W. Hardy, Euclid, Ohio, assignor to The Marquette Metal Products Company, Cleveland, Ohio, a corporation of Ohio Application November 19, 1945, Serial No. 629,539

2 Claims. (Cl. 170—160.31)

This invention relates to a controllable or variable pitch propeller mechanism and to a fluid operated control system therefor which may be manually or otherwise actuated for adjusting the pitch of the blade or blades while the craft served by the propeller mechanism is in flight or motion.

The objects include provision of a new or improved mechanism and control of that character. The present application shows a controllable pitch propeller mechanism very much on the order of that shown and claimed in my U. S. Patent Serial No. 2,491,375 issued December 13, 1949; and a further object is to provide, in connection with a propeller mechanism of the type there shown, an improved arrangement for preventing accidental movement of the blade or blades out of adjusted position.

A specific object is to provide an improved anti-creep valve mechanism for the purposes outlined in the next preceding object.

Another object is to provide, in a hydraulic controllable pitch propeller, means for preventing application of such fluid forces to the blade adjusting servomotor and other fluid actuated mechanisms as might damage the servomotor or such mechanisms.

A further object is to provide control valve mechanisms in a fluid actuated controllable pitch propeller, which valve mechanisms are not subject to improper operation due to centrifugal forces acting on the valve elements.

A further object is to provide various improvements in relation to a releasable pitch limit control mechanism by which the blade pitch adjustment is normally limited within a certain angular range and by which the range may be increased for special operations such as feathering and reverse.

A further object is to provide a hydraulically actuated variable pitch propeller mechanism having an improved means for adjustably limiting the kinetic forces applicable in effecting blade adjustment during flight.

A further specific object is to provide, in a hydraulic variable pitch propeller mechanism, an improved means whereby the tendency of the blades to return toward low pitch position is obstructed by an adjustable automatically operating limiting means enabling return movement only after the forces causing such tendency reach a predetermined set value.

A further object is to provide an improved fluid pumping and valving system for a hydraulically actuated variable pitch propeller mechanism.

Another object is to provide an improved cam follower arrangement in an adjustable pitch propeller having a cam operated pumping and/or valving system for hydraulic pitch adjusting operation of the blades.

A further object is to provide an improved and simplified selectively and manually operable hydraulic actuating and controlling system for causing operation of blade pitch adjusting means to take place by power applied to the propeller to turn it.

Other objects and features of the invention will become apparent from the following description of the preferred form shown in the drawings, wherein:

Fig. 6 is a subassembly sectional view taken at 6—6 on Fig. 4, showing a fluid pump and valve unit used to actuate the pitch limit stop mechanism.

Fig. 7 is a view similar to Fig. 6, showing one of two identical pump and valve units which actuate the pitch adjusting servomotor mechanism of Fig. 2 respectively in opposite directions.

Fig. 8 is a detail sectional assembly view taken as indicated by the line 8 on Fig. 2, showing the adjustable anti-creep valve mechanism.

Fig. 9 is a detail sectional assembly view taken along the line 9—9 on Fig. 2, showing the hydraulically actuated or servo portion of the pitch limiting stop mechanism.

Fig. 10 is a detail view of a labyrinth joint arrangement, being an enlargement of a portion of the mechanism shown at the lower right on Fig. 1 and taken on the same plane as Fig. 1

Fig. 11 is a transverse sectional and elevational view, the sectional part being as indicated by the line 11—11 on Fig. 1, showing a preferred mounting arrangement for a set of concentric cams which actuate the movable elements of the pump and valve unit assemblies mentioned in connection with Figs. 6 and 7.

Figure 1:
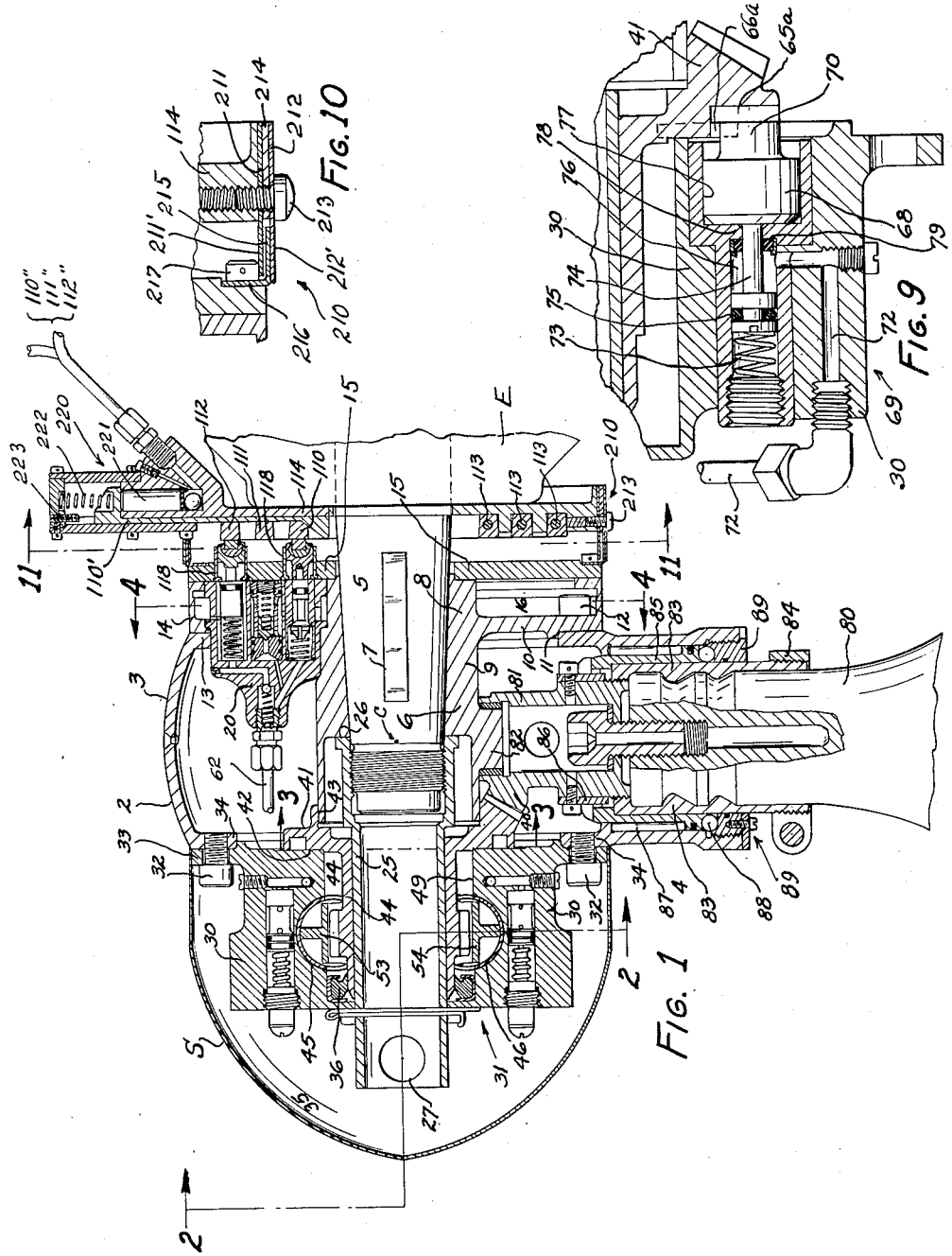
Fig. 1 is a longitudinal assembly sectional view in a vertical plane centrally cutting the propeller mechanism and one blade mounting.

Fig. 12 is a partially schematic view showing parts of two cooperating hydraulic systems, one being rotatable with the propeller and the other being arranged for actuating the first system but not rotatable with the propeller and comprising a selective master control valve mechanism for initiating operation of the different parts of the first system from a common point as on the instrument panel of an aircraft.

Fig. 13 is a sectional view of the selective hydraulic actuator shown at the right in Fig. 11 and as indicated at 13—13 thereon.

Fig. 14 is a partly sectional view of the actuator arrangement according to Fig. 13, the upper portion being cut by the plane indicated by line 14—14 on Fig. 13.

Referring further to Figs. 1 to 4, the hub 2 is made as a high tensile steel shell (e. g. forged steel) having a generally spherically-formed hollow central portion 3 from which tubular integral arms or blade-supporting barrels 4 extend radially, shown for example as three in number. The barrels are spaced equally about the axis of rotation of the hub, which is to say the axis of an impeller shaft 5, Fig. 1, comprising, for example, part of the engine crank shaft. A forward portion of the engine crank shaft housing E is shown. The hub 2 is supported on the crankshaft 5 through the intermediary of a lightweight high tensile steel hub carrier 6 securely fastened to the hub and concentric therewith.

A central tubular portion of the carrier 6 is wedged onto and drivingly keyed as at 7 to a tapered portion of the crankshaft. A tubular nut 25 has its rearward end jammed against the hub carrier at 26. The forwardly projecting tubular end of the nut 25 has a cross hole 27 for a wrench bar.

The tubular central portion of the hub carrier extends rearwardly as at 8 and forwardly as at 9 from a wall or web portion 10 of the carrier, which latter portion is suitably shouldered as at 11 for attachment to the hub as by a series of screws 12 (Fig. 4) passing through the wall or web 10 and into an inturned peripherally continuous rear flange 13 of the hub machined to fit the shoulder surfaces 11 of the carrier.

Surrounding and in spaced relation to the rearward tubular extension 8 of the carrier, the wall or web 10 of the latter has an annular rearwardly projecting flange 14 of slightly less length than the tubular extension 8 and concentric therewith, so that the two portions 8 and 14 and the supporting wall or web 10 constitute a generally imperforate annular channel. The channel is bridged by a cover plate 15 and the annular space 16 so enclosed is hermetically sealed in part by the cover plate 15 through suitable, preferably soft metal, gaskets (not shown) squeezed tightly between adjacent surfaces of the carrier portions 8 and 14 and inner and outer marginal surfaces of the plate 15 when the latter is attached to the carrier as by appropriate screws. The screws 12 preferably have soft metal gaskets (or other sealing material, not shown) beneath their heads and forced against the carrier wall or web 10. Further sealing for the space 16 is provided in connection with pump and valve units 20, 21 and 22 (see Figs. 1, 4, 6 and 7, later described) through which the bodily rotated, pitch-adjusting hydraulic system, which is supplied with hydraulic fluid exclusively from the hermetically sealed annular sump afford by the space 16, is caused to be operated in the desired manner as will be explained later.

Figure 2:
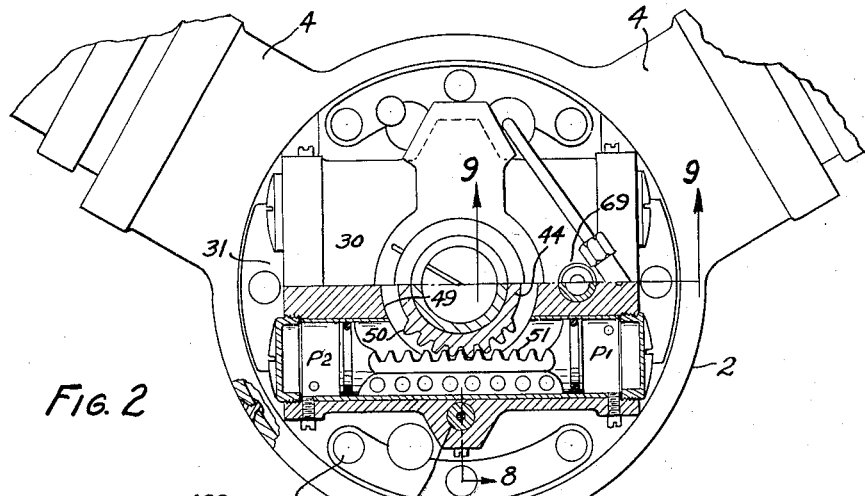
Fig. 2 is a transverse sectional view as indicated by the line 2—2 on Fig. 1, principally showing the blade pitch adjusting servomotor arrangement.

A housing 30 for a blade adjusting servomotor generally indicated at 31, Figs. 1 and 2, is secured to the forward face of the hub 2 centrally thereof as by a series of screws 32 which pass through a circular flange 33 of said housing 30 into threaded openings in a forwardly disposed inturned flange 34 of the hub. A split cotter pin 35, positioned as shown by Fig. 1, engages circumferentially spaced recesses in the servomotor block 30 and the forward end of the nut 25 holds the latter against turning out of seated position on the crankshaft.

The blades 80 of the propeller have their shank portions swivelled inside the barrels 4 concentric therewith and radiating from a point C, Fig. 1, about which the spherically formed portions of the hub are generated. Secured to the inner ends of the blade shanks by suitable means more fully shown and described in my prior application identified above, are identical blade adjusting bevel gear sectors 40 in zero backlash mesh with complementary teeth of a master blade pitch adjusting and equalizing gear 41, concentric with the crankshaft 5 and journalled on the hub carrier 6. Only one blade mounting is shown, the others being the same.

Each blade adjusting gear sector 40, Fig. 1, has a supporting hub 81 journalled at its inner end on one of a set of radial projections 82 of the hub carrier 6 as described in my said copending application. The blade 9 in sector hub 81 is connected to a split blade-retaining sleeve assembly 83 (two half shells) embracing and complementary to the usual annularly ribbed shank of the blade 80 and held fast on the blade as by a clamping collar 84. Surrounding and retaining the split sleeve 83 is an inner tubular bearing race sleeve 85 connected to the hub 81 of the gear sector 40 as by a key 86. The bearing sleeve 85 is turnably supported by a set of radial anti-friction bearing rollers 87 and an end-thrust-receiving anti-friction ball bearing assembly 88. The balls of the bearing 88 are secured in the blade mounting barrel 4 of the hub by an adjustable race-forming nut assembly 89, adjustably locked in the barrel 4 by appropriate means.

The teeth of the master blade adjusting and equalizing gear 41 may be partly omitted in three places around the gear circumference to save weight as suggested at the upper part in Fig. 1, but when the propeller is designed for reverse pitch and feathering a nearly complete set of teeth is usually provided. A complete set is partially illustrated in Fig. 3. The master gear 41 has its principal radial support at 43 on the forward extremity of the tubular portion 9 of the hub carrier, additional radial support at 44 on the servomotor block 30 and axial thrust support, opposed to the blade gear thrust reactions, by reason of abutting the servomotor block as at 42 over a comparatively wide face of the master gear. The generally tubular hub portion 44 of the master gear 41 surrounds with slight clearance the forwardly extending tubular portion of the nut 25, so that the gear 41 does not normally receive bearing support from the nut.

The blade-pitch-adjusting servomotor as shown by Figs. 1 and 2 comprises parallel cylinders 45 and 46 formed or provided in the block or housing 30 and sealed at their opposite ends as by removable threaded plugs or caps 48. The cylinders 45 (Fig. 2) are intercepted midway between their ends by an axial bore 49 through the block 30 around the hub 44 of the master or power gear 41. The hub 44 has formed thereon diametrically opposed sets of pinion or gear teeth 50 which mesh respectively with rack teeth 51 of double ended pistons 53 and 54 in the cylinders. A seal assembly 36 is provided around the outer end of the hub 44 of the master gear 41 to retain a supply of lubricant for the meshing rack and pinion teeth and associated moving parts.

The pressure chambers P1, P2, P3 and P4 of the servomotor cylinders (cf. Figs. 2 and 12) are cross connected in the manner schematically shown in Fig. 12 by suitable bores 59 and 60 preferably formed in the servomotor block 30 so that pressure fluid supplied and discharged interchangeably through conduits 61 and 62 will move the two pistons 53 and 54 simultaneously but in opposite directions in driving the master or power gear through the rack and pinion tooth connections. The manner of forming the necessary passages in the servomotor block is more clearly described in my U. S. Patent Serial No. 2,433,990 issued January 6, 1948.

The portions of the releasable pitch limiting stop mechanism which are carried by the forward portion of the hub are illustrated particularly by Figs. 3, 9 and 12, but in the latter view only schematically and in a different specific form for convenience only as will be described later. The stop mechanism normally prevents the blades from being shifted on their swivel mountings above and below maximum and minimum pitch angles appropriate for forward driving of the craft while, at the will of the operator, enabling pitch changing movement of the blades below minimum normal pitch for reverse as may be required for braking purposes and above or beyond maximum forward pitch for feathering of the propeller.

Figure 3:
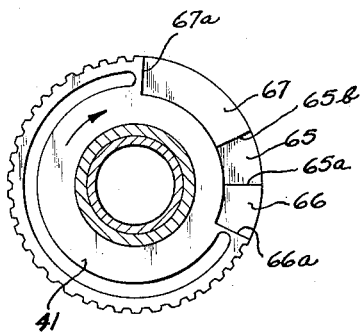
Fig. 3 is a transverse sectional detail view taken along the line 3—3 on Fig. 1, showing the portion of a manually controlled pitch limit stop mechanism which is embodied in a master pitch adjusting and equalizing gear.

Referring to Fig. 3, the master gear 41 has on its rear side and indented forwardly therefrom three circumferentially extending contiguous flat surfaces 65, 66 and 67, the latter two of which are coplanar. The master gear, as turned by the pitch adjusting servomotor 31, rotates clockwise to move the blades from low to high pitch and for feathering and counterclockwise to move the blades toward low pitch and controllably into reverse pitch position. The flat surface 65 is indented forwardly at radial abutment surfaces 65a and 65b with reference to the coplanar surfaces 66 and 67, and those surfaces in turn terminate circumferentially in opposite directions at step-like radially disposed abutment surfaces 66a and 67a.

In Fig. 9, an axially shiftable latch plunger 68 of a hydraulically releasable pitch limiting latch mechanism 69 has its rearward reduced cylindrical end portion 70 normally seated between the limiting shoulders 65a and 65b to limit rotation of the master blade adjusting gear for normal forward driving pitch adjustments. The position of the mechanism 69 with reference to the servomotor block is shown in Fig. 2. The latch plunger 68 moves parallel to the main rotational axis of the propeller. The reduced cylindrical end 70 of the latch plunger as shown in Fig. 9 has been moved out of the deeply recessed portion 65 of the gear so that the latch is in position to allow the gear to turn past its normal pitch changing positions, namely, within the limits of the abutments 65a and 65b. Thus in that withdrawn position of the latch, the gear may be turned so that the reduced end 70 can traverse the surfaces 66 and 67 to their respective limits.

In the illustrated arrangement according to Fig. 9, the latch plunger 68 is withdrawn from its normal position between the abutments 65a and 65b by hydraulic action of fluid introduced as through a conduit 72 (see also Fig. 12) by a manually actuated power operated pump, and the latch is returned to initial position by a spring 73 axially opposing the hydraulic releasing operation. A guiding housing for the latch plunger is inset into the rear face of the servomotor block 30 and an axially forwardly extended stem portion 74 of the latch plunger has a fluid sealing piston head 75 operating in a cylindrical pressure chamber 76 aligned with the guide bore 77 for the plunger, but separated therefrom as by a wall 78 sealed against exit of fluid from the cylinder chamber 76 by a suitable sealing assembly 79. To operate the latch block 68 to master gear releasing position so that the gear can move to reverse and feathering positions, fluid is supplied from the sump 16 by the pump and valve unit 22 shown in Figs. 4 and 6. The pump and valve unit 22 is generally similar to the units 20 and 21 which supply and exhaust the cylinders of the servomotor 31, and the characteristics common to the three units will be described only with reference to the unit 22.

The pump and valve unit 22, Fig. 6, comprises a main body 90 of generally cylindrical form with parallel flanges 91 and 92 and associated respective sealing rings 93 and 94. The seals of the flanges are forced respectively against the main wall members 10 and 15 which axially enclose the sump 16, Fig. 1, so that fluid cannot be released from the sump past the unit flanges 91 and 92 forwardly or rearwardly of the propeller. The sealing ring 93 seat against an annular stepped shoulder formed in the wall 10 and the sealing ring 94 is pressed firmly against the flange 92 when the plate 15 is secured in position on the hub carrier to close the sump space 16. Between the flanges 91 and 92 the side walls of the body 90 are cut away on both sides as at 95, principally to allow free passage of fluid in the sump circumferentially thereof from one side of the unit 22 to the other. The pump mechanism 96 of the pump and valve unit 22 operates under operator's control to pump fluid from the sump 16 into an axial discharge bore 97 in a forward central extension 98 which forms part of the conduit 72, Figs. 9 and 12, part of which assembly is so identified on Fig. 6. The piping leads through the servomotor block 30 for connection with the duct portion 72 shown on Fig. 9 forwardly of the block.

Referring further to Fig. 6, the pump 96 comprises a peripherally sealed piston or plunger 100 slidably mounted in an eccentric but axial bore 101 of the body 90, having a lateral inlet port 102 and a discharge duct 103, part of which extends to the bore 97 past a spring closed check valve 104 shown closing the outer end of the duct 103. The piston 100 has an operating stem 104 projecting rearwardly from the body 90 for actuating the piston during and consequent upon rotation of the propeller and operation of the controls as will be described later. A high rate spring 105 returns the piston to the position in which shown after each forward pumping movement of the piston. The check valve 104 retains the fluid forced past it into the line 72.

The operating stem 104 of the pump 100 is thrust forwardly consequent upon propeller rotation whenever the intermediate one of three ring cams 110, 111 and 112 is swung forwardly about its associated fixed hinge mounting pivot. All three pivots are designated 113 at the lower right in Fig. 1 and lower left in Fig. 11, the pivots being carried on a fixed adapter plate 114 rearwardly from the main closure plate 15 of the sump chamber 16 and parallel therewith, being mounted on the engine housing. When the ring cams are selectively swung forwardly about their pivots 113, the pump or valve stems of the units 20, 21 and 22, corresponding in radial position to the forward faces of respective ring cams, are thrust forwardly parallel to the axis of rotation of the propeller once for each turn of the propeller by operative engagement of the forwardly inclined cam surfaces with the pump plunger or valve stems. The hydraulic means for selectively controlling the positions of the ring cams will be described later in connection with Figs. 1, 11, 13 and 14.

Referring again to Fig. 6, the forward hardened, smooth, wear resisting face 111a of the ring cam 111, which is positioned to operate the stop release pump plunger 100, slidably engages very hard or wear resisting planar surface of a cylindrical button or block 116, which is part of one of a set of identical tappet assemblies 117, one for each pump plunger or valve to be actuated in controlling the propeller mechanism. The tappets are mounted for easy sliding movement in guide sleeves 118 in parallel forwardly counterbored holes through the sump closure plate 15 as shown best in Fig. 1. Each guide sleeve has a flange 119 shouldered into the counterbore of its associated hole in the plate 15 and the flange is held thereby in light contact with the associated body (e. g. 90) of the pump and valve unit served. The guide sleeves 118 do not present any sealing problem with reference to the sump 16, since their forward ends lie within the areas sealed from the sump 16 by the sealing rings 94, Fig. 6, which are forced tightly against the plate 15 all around the bodies (e. g. 90).

In order that the smooth faces of the tappet buttons 116 will always ride flat against the actuating faces of the ring cams 110, the buttons are rockingly mounted in spherical sockets 120 of tappet barrels 121 in the guide sleeves. Preferably the cam follower buttons 116 are of very hard metal such as Carballoy set into mounting pieces or shoes 122 of self lubricating character such as Oilite bronze which furnish the necessary friction reduction so that the mountings will always move very freely in the spherical sockets 120, without having to provide more than a small area of contact at the button faces between the cam followers and the ring cams. The mountings are held in the sockets by appropriate means such as slightly inwardly spung flanges 124 around cylindrical outer end portions of the spherical sockets.

In addition to the pump plunger assembly and check valves 104, the unit 22 (Fig. 6) has a restricted discharge aperture or bleeder provided at 126 between a plug 127 and the bore 128 of the body 90 which carries the plug. The rearward end of the plug 127 seals the bore 128 at 129 and fluid discharged through the bleeder aperture 126 from a duct 130, 131 communicating with the duct or pipe 72 supplied by the pump 96 is returned to the sump through a cross passage or port 132 in the body 90. The effective size of the bleeder aperture 126 is predetermined with reference to the capacity of the piston chamber 76 of the pitch limit latch plunger assembly, Fig. 9, and the strength of the spring 73, so that after the latch plunger 68 has been withdrawn from normal pitch limiting position to allow the master blade pitch adjusting gear to turn beyond the normal forward driving limits in either direction, the plunger will automatically return quickly to said normal-pitch-limiting position between the stops 65a and 65b as soon as the gear has been moved back to bring the gear face 65 into alignment with the latch plunger.

In order that operation of the pump 96 will not damage any part of the latch control mechanism in the event the cam ring 111 is held in pump plunger actuating inclined position longer than it should be in order to accomplish withdrawal of the plunger portion 79 from the normal pitch limiting area defined between flat surface 65, Fig. 3, the unit 22, Fig. 6, is provided with a relief valve mechanism 135 comprising as shown a tubular body 136 sealed at both ends in a bore 137 of the body 90 parallel to the bores 101 and 128. For sealing purposes, the body 136 has land portions 138 and 139 provided with peripheral sealing rings 140 and 141 respectively and, between the lands, the body 136 has a reduced diameter portion 142 providing a space communicating with a port 132 beyond the plug 127 through a lateral port 144 and an annular channel 145 in said plug. The body 136 has a valve seat 146 in a bore 147 of the body leading to the conduit 72 beyond the check valve 104 as by a flared open forward end of the body 136 and communicating oblique passage 148 intercepting the bore 130. Slidably fitting an enlarged bore 149 of the body 136 is a plunger type valve plug 150 normally closing against the seat 146 at a frusto-conical end portion of the plunger. The plunger is forced against the seat by an accurately calibrated spring 152 maintained in position in an axial rear cavity of the plug by an adjustable closure plug 153 adjustably occupying the somewhat enlarged threaded portion of the bore 149 of the body 136.

The valve plug 150 is forced out of contact with its seat 146 whenever there is an over supply of fluid delivered by the pump plunger 100, Fig. 6, to the piston chamber 76 of the latch mechanism shown on Fig. 9, and when the plug is thus unseated the excess fluid is dumped into the sump 16, partly through cross passages 154 in the wall of the body 136.

In order to prevent loss of fluid from the sump past the threads of the plug 153 and the valve body 136, the rear end portion of the bore 137 for the valve body has a sealing ring 155 set into an annular recess, part of which is formed in the body 90 and part in the valve body 136. The ring is pressed into its seat so as to cut off all possibility of loss of fluid past the threads when the rear end closure plate 15 is attached to the hub carrier 6 to close the sump 16.

The operation of the latch mechanism, when the cam ring 111 is swung forwardly, is fairly well illustrated in Fig. 12. Attention is called to the fact that the indentations 65x, 66x and 67x as shown on Fig. 12 and which correspond to the indentations 65 and 67, Fig. 3, are illustrated as though associated directly with one of the servomotor pistons of the pitch adjusting servomotor mechanism 31. The cam ring 111 is schematically shown in position to actuate the pump 96 and withdraw the latch plunger 68 from latching position. The acting end of the plunger, for illustration purposes, extends to the left in Fig. 12 instead of to the right as in Fig. 9 and is shown riding the surfaces 67x to allow an abnormal pitch adjusting movement of the servomotor as necessary for feathering. To release the latch, a single pumping impulse is usually sufficient, whereupon the cam ring is returned to initial position as shown in Fig. 9. A feature of the valve 135, Fig. 6, is that no amount of centrifugal force due to high speed of rotation on part of the propeller can unseat the pressure limiting valve plug 150 or cause inaccurate closing of the valve plunger against its seat 146 after the plug has been forced back toward its spring 152 in relieving pressure in the line 72 above such as is necessary to cause release of the latch.

Figure 4A:
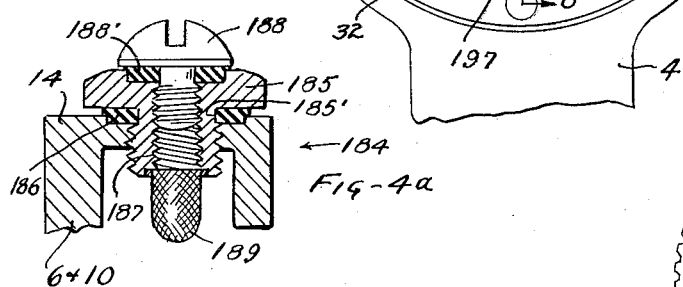
Fig. 4 is a transverse sectional assembly view taken as indicated by the line 4—4 on Fig. 1, showing the relative positions of the main pump and valve assembly units which either cause operation of the pitch adjustment of the blades in respective directions or release of a normal pitch limiting stop.
Figure 4:
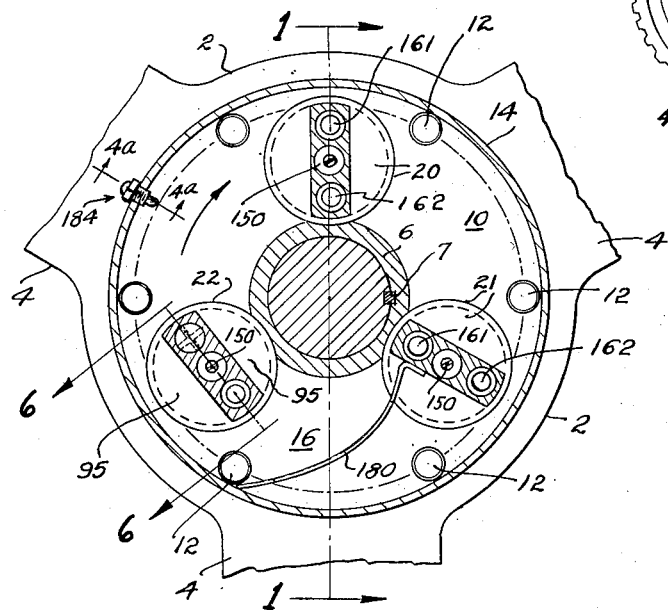

Referring now to Figs. 1, 4, 7, 11 and 12, the hydraulic pitch adjusting mechanism which rotates with the propeller at all times and forms, with the servomotor and sump, a hermetically sealed system, includes the two pump and valve mechanism units 20 and 21 which are identical in construction, see Fig. 7, but the pump and valve elements of which occupy relatively reversed positions as shown best in Figs. 4 and 12, so that each of the actuating ring cams 110 and 112, when swung forwardly, operates only a pump 161 of one unit and a fluid exhaust valve 162 of the other unit.

The body 160 of each pump and valve unit 20 and 21 and the pumps and relief valves in the body 160 preferably are identical with the corresponding elements in the body 90, Fig. 6, already described. The principal corresponding parts are numbered the same as in Fig. 6. The pump 161 of unit 20 supplies pressure fluid to the displacement chambers P2 and P3 of the servomotor as shown on Fig. 12, and, meanwhile, the exhaust valve 162 of the unit 21 exhausts fluid from the displacement chambers P1 and P4. Note that the outer cam ring portions of which are indicated at 112 in Fig. 12, are in active position relative to cam ring 110 causing reciprocation of the pump plunger of unit 20 and opening of the exhaust valve of unit 21. As more fully explained in my Patent No. 2,491,375 issued December 13, 1949, the pumping and valving operations of units 20 and 21 are so timed that the valve 162 of each unit is always open before the pumping by the cooperating unit starts and continues to remain open until the pumping (forward motion of pump plunger) ceases.

The construction of the two exhaust valves 162, see Fig. 7, is very similar to that employed in the prior application just mentioned, there being a poppet type valve plug 170 in a sleeve 171 filling the inner or forward end of the bore 128 of the body 160. The sleeve has a seat 172 for the plug and cross passages 173 leading to the sump 16 through the port 132 around a reduced portion 174 of the sleeve. The guide stem 175 is sealed at 176 around the bore of the sleeve in which the stem slides and the rear end of the sleeve 174 has a similar peripheral seal 177 against the adjacent portion of the main body bore which receives the valve sleeve. The plug 170 has a return or closing spring 178. The tappet assemblies 116—121 for both the pumps 161 and valves 162 are the same as the assembly illustrated at the right in Fig. 6, wherefore there is no angularity between the forward cam faces and follower shoe elements.

Figure 5:
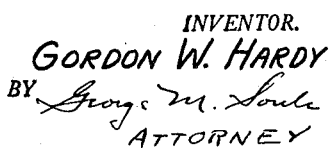
Fig. 5 is a detail plan view showing a fluid guide or ramp such as illustrated at the lower part of Fig. 4.

Because the pump 161 of the unit 21 lies near the center of rotation of the propeller and centrifugal force tends to move the hydraulic fluid in the sump 16 outwardly, a curved sheet metal ramp or deflector 180, Figs. 4 and 15, is disposed across the sump and inclined in a direction with reference to propeller rotation such that, in event of depletion of the fluid supply or failure fully to charge the system, there will nevertheless be adequate fluid maintained adjacent the inlet port 102 of that pump. The other pump inlets are farther from the center and require no similar deflectors. The shape of the deflector 180, Fig. 5, is such that it can be installed and held in position without fasteners. The portion of reduced width at the left provides a shoulder 181 for support by the rear flange of the hub carrier to which the closure plate 15 is attached. The end of the deflector adjacent the shoulder 181 is inserted beneath one of the screws 12 and held thereby in position. The opposite end of the deflector has a bent tongue 182 which is forced against the adjacent flat side of the associated body 160 of unit 21 when shoulders 183 defining the tongue are sprung past the circular end portions of the body 160 as the deflector is moved into the installed position about the already inserted opposite end of the deflector as a pivot.

The hermetically sealed hydraulic system may be charged with hydraulic fluid in various ways, but in order to insure filling of substantially all the spaces of the system it is only necessary to provide a single sealable filler inlet assembly 184 in one of the peripheral walls of the sump 16, as shown in Fig. 4 and Fig. 4a, and temporarily to vent both sides of the servomotor and the hydraulic pitch limiting latch systems as by removing plugs thereof shown in various places. The servomotor 31 may be vented, for example, by loosening the hollow plugs 207 of the anti-creep valve assemblies 197 and 198.

The filler plug assembly 184 as shown particularly by Fig. 4a, comprises a threaded sleeve 185 which is permanently magnetic for reasons explained below. The sleeve has a suitable head for engagement with a wrench and the threaded shank of the sleeve is undercut as at 185' to support a sealing ring 186. The sealing ring is forced into a complementary circular recess in the wall 14 of the hub carrier when the sleeve is screwed into place. For quickly filling the sump and all the fluid receiving spaces connected therewith under pressure, the sleeve 185 may be removed so as to provide a fairly large filler opening. In that case, the fluid is strained through a fine mesh screen extraneous to the propeller and not shown. For final filling of whatever small space of the sump remains to be filled and for replenishing any slight leakage which may later occur in the hydraulic system, the sleeve 185 is provided with a central through bore 187 which is threaded to receive a closure cap screw 188. A seal 188' is provided beneath the head of the closure screw 188, the seal being mounted on an undercut portion of the screw beneath the head and occupying a circular depression in the outer face of the sleeve 185. At the inner end of the bore 187 a cup strainer 189 is secured as by solder. For replenishing the system at any time, the propeller is turned so as to present the filler assembly upwardly, the screw plug 188 is removed and hydraulic fluid then introduced through the bore 187 and screen 189 as by means of an oil can.

During rotation of the propeller, the hydraulic fluid in the sump is in constant motion circumferentially of the wall 14 of the sump provided in part by the rear flange of the hub carrier wall 10 and, as since all the fluid in the system eventually passes over the wall 14, any ferrous particles picked up by the fluid in passing through the hermetically sealed system will be attracted and retained by the magnetic sleeve 185.

It will be readily understood from the inspection of Figs. 7 and 12, that the check valves 104 prevent retrogressive movement of fluid forced by the pumps 161 into the delivery ducts 61 and 62 respectively leading to effectively opposite ends of the servomotor displacement chambers while, at the same time, the delivery lines are open to communicate at all times through the ducts 130 with the chambers within the valve sleeves 171 which normally are blocked from communication with the sump by the exhaust valve plugs 170. At the same time, the ducts 130 are open to respective relief valves 135 through the duct passages 148 so that if the pumping of either unit 20 or 21 is continued after the latch plunger 68 (Figs. 9 and 12) has made contact with any one of the abutments 65a, 65b, etc., such pumping cannot damage the servomotors or any of the parts connected with the various communicating fluid lines. Again the plungers 150 are not subject to inaccurate operation either for sealing or unsealing the ports 146 by centrifugal force acting on the sealing plungers, and the sealing effect of the plungers is preset through the carefully calibrated springs 152 so that relief of pressure in the delivery lines cannot occur at a less pressure value than necessary to effect blade pitch adjustment under the most adverse conditions that may be reasonably expected.

In case the propeller is arranged for both forward and reverse pitch control, then both the delivery lines 61 and 62 (Fig. 12) are provided each with an adjustable anti-creep valve mechanism, the respective mechanisms being indicated at 197 and 198. One anti-creep valve is shown in detail in Fig. 8 and one schematically in Fig. 12. Each mechanism 197 and 198 comprises a plunger 200 slidably sealing at 200', a bore 201 in the servomotor block between the opposite ends of the bore and maintained normally against the bottom of said bore (right, Fig. 8) by a calibrated spring 202, holding the plunger in such seated position with an initial force, for example of 400 p. s. i. Each plunger has an axial bore 203 containing a spring-seated, nonreturn or check valve plunger 204 which admits fluid from the feed line 61 or 62 to the servomotor from the pump of the respective unit 20 or 21 comparatively freely but normally blocks return flow from the portion 61a or 62a leading from the anti-creep valve to the servomotor. Return flow can only occur when the pressure tending to create such flow is increased to a point somewhat greater than that resisted by the spring 202 (i. e. greater than the assumed 400 p. s. i.). When that occurs, the plunger 200 is forced forwardly of the propeller (left, Fig. 8) by such greater pressure, and an adjustable check valve release pin 205 forces the plug 204 of the check valve off its seat to enable escape of fluid from the delivery line portion 61a or 62a to the forward end of the bore 201, hence to the portion of the said line 61 or 62 leading back to the unit 20 or 21. The pin 205 is screw threaded for adjustment at 206 into a removable plug 207 which closes the forward end of the bore 201 in the servomotor block. Adjustment of the release pins 205 can be effected by removal of the spinner cap S, Fig. 1, whereupon access to the threaded portions of the release pins is enabled through hollow threaded portions of the plugs 207 by removal of closure screws 208 of respective units 197 and 198.

It will be seen that return flow from the servomotor displacement space P1, for example, see Fig. 12, through the anti-creep valve mechanism 197 is blocked until the pressure in the displacement chambers P1 and P4 has been increased to such a point as will overcome the effective force of the spring 202 and then to move the plunger 200 a sufficient distance to cause the plug 204 to be unseated. Additionally, it is necessary that the exhaust valve 162 be open simultaneously. Normally, as heretofore stated, the valve 162 would be open only when the pump 161 of unit 20 is operating. Thus there is a double check against movement of the servomotor by the blades out of adjusted position by air impact on the blades, first by the anti-creep valve mechanism and second by the normally closed valves 162 of the respective units 20 and 21. When the propeller is designed only for forward pitch and/or feathering, but not reverse, one of the anti-creep valve mechanisms 197 and 198 is omitted from the construction.

Referring again to the adapter 114, Fig. 1, on which the cam rings 110 to 112 are mounted, the adapter and the sump closure plate 15 carry respective parts of a labyrinth seal 210, shown best in Fig. 10, and which as shown by Fig. 11 extends entirely around the circular surface between the adapter and end plate. The labyrinth seal comprises a pair of relatively thin annular rings 211 and 212 maintained in spaced relationship to each other by a spacer ring 214 all secured to the entire enveloped peripheral surface portion of the adapter plate 114 as by a series of screws, one of which is indicated at 213. The thus spaced apart forwardly extending marginal portions 211' and 212' of the rings 211 and 212 slidably embrace between them a rearwardly extending annular flange 215 of a ring 216 secured as by screws 217 to the rear side of the sump closure plate 15. The working space of the ring cams and tappet buttons is thus closed by a sealing arrangement enabling free turning movement of the propeller but which will contain a suitable lubricant such as sponge grease, the supply of which lasts indefinitely.

For operating the ring cams 110, 111 and 112, respective slidable cam strips 110', 111' and 112' are guided for vertical movement in suitable channels formed in the adapter 114 behind the ring cams for engagement with complementary beveled rearwardly disposed surfaces of the ring cams. Lifting of the cam strips is accomplished by individual servomotor units all of identical construction, one of which is as illustrated at 220 in Fig. 1, carried on the adapter plate 114. Both the construction and operation of the servomotor units 220 are essentially the same as in my copending application 528,412. Each unit includes a vertically slidable piston plunger 221 bearing upwardly against the associated cam strip, a return spring 222 and an adjustable stop 223 positioned for engagement with the top of the associated cam strip.

For operating the cam actuating servomotor mechanisms 220, the fluid lines 110'', 111'' and 112'' lead respectively to individually and selectively operable actuator pump units 230, 231 and 232, shown best on Figs. 13 and 14. The pump units 230 etc. are mounted for reciprocating movement in a common two part housing 234 positionable on the instrument board of the craft or in any other suitable location. The essential construction of each of the pump units is the same and one only, for example the unit 230 shown at the left in Fig. 14, will be described in detail. Corresponding reference characters are applied to the other pump units.

The actuator arrangement for the pump units 230 and 232 is a rotary cam 235 acting selectively upon push rods 237 and 236 of the units 230 and 232 respectively and controllable as by a suitable hand crank 241 rigidly coupled with the cam as by a shaft 242. The actuator for the pump unit 231 which operates the pitch adjusting stop latch of Fig. 9 comprises a slidable plunger 238 accessible from the same side of the housing 234 as the crank of the cam. Both the crank and the handle 238' of the plunger can be operated simultaneously by one hand of the pilot or copilot. Turning of the crank 241 in a counterclockwise direction, Fig. 14, operates the push rod 237 for adjusting the propeller toward high pitch and feathering, and turning in a clockwise direction operates the push rod 236 for adjusting the propeller toward low pitch and reverse pitch.

Referring further to Fig. 14, both pump units 230 and 232 are shown as supplied with operating fluid from a common supply tank 245 formed in the top of the housing 234. The supply tank has a filler tube 246. Respective supply ducts for the pumps of units 230 and 232 are shown at 251 and 250, leading to normally open portions of the bores 252 in which the push rods 236 and 237 slide.

Referring to the left hand portion of Fig. 14, the push rod 237 has a short reduced diameter partly tubular stem 253 beyond a shoulder 254. The tubular part of the stem is axially open at its left end at 256 and has communicating cross passages 255. The short stem 253 extends part way through the central bore of a piston 257 slidably mounted within the axial bore 258 of a connector fitting 259 threaded into the adjacent end of the body 234 as at 260, in alignment with the push rod 237. The bore 258 is larger than the guide bore of the push rod so as to provide an abutment shoulder at 262 for limiting the movement to the right on part of the piston 257. The piston has a sealing ring 261 in a suitable groove for sealing engagement with the bore 258. The bore 258 communicates always with the conduit 110'' and similar or operatively equivalent bores of the other pump units similarly communicate always with their conduits 111'' and 112''. Within the bore 258 is a return spring 263 for the piston 257 and the spring acts against one side of a flange 264 of a sleeve 265 open at both ends and provided with cross passages at each side of the flange. The tubular portions of the sleeve 265 are the same size as the stem 253 of the push rod 237 and one end of the sleeve is in axial abutment therewith as shown. Around the stem 253 and freely movable on it between the piston 257 and the shoulder 254 of the push rod is a sealing ring 266.

If the push rod 237 is moved to the left toward the piston 257 from the position in which shown the cross passages 255 and the annular passage between the stem 253 and the piston are both sealed from communication with the supply duct 251. The shoulder 254 of the push rod 237 forces the sealing ring 266 axially and meanwhile radially against the stem 253 at the right of the cross passages 255 to effect both sealing operations. Thereupon, the chamber provided by the bore 258 is sealed off from the supply conduit 251 and further movement of the push rod causes the piston to eject fluid from the bore 258 into the delivery line 110'' leading to the associated ring cam actuating servomotor 220. When the push rod 237 is returned to its initial position, as by the return spring 263 acting to turn the cam clockwise (Fig. 14), said spring through the flanged sleeve 265 causes the piston to be returned to initial position. The push rod itself is moved to the right by abutment between the sleeve 265 and stem 253 of the push rod. The actuator fluid system is thus reopened for communication with the supply tank.

When the cam 235 is turned in the counterclockwise direction described above and necessary to actuate the push rod 237, the push rod 236 maintains its initial position due to a concentric portion 235' of the cam. The cam has a similar concentric portion 235'' which rides idly against the push rod 237 when the cam is being turned clockwise to operate the push rod 236.

Referring further to the pump unit 231 of the pitch limit latch control, the feed line from the supply tank 245 may comprise a duct 270, Fig. 11 only, the lower end of which enters a port 271 which is open to the space between the push rod 240 and the associated piston 257 of that pump unit. Actuation of the push rod 240 by withdrawal of the actuating plunger 238 to the right (Fig. 13) lifts the push rod 240 through the agency of the cam surface 239 of the push rod. At the lower terminus of the cam there is a flat shoulder 273 which in the fully withdrawn position of the plunger 238 rests upon a flat shoulder 274 of the control plunger 238 to cause the push rod 240 to remain in lifted ring-cam-actuating position. Thus the operator has only to pull out the hydraulic latch actuating control plunger 238 its full distance and leave it temporarily in that position while operating the crank 241 to cause adjustment of the propeller blades to the desired abnormal pitch, i. e. feathering or reverse. The return of the plunger 238 to initial position requires only enough manual movement to separate the flat surfaces 273 and 274 from mutual contact, whereupon the spring 263 acting through the inclined cam contact 239 returns the control plunger to neutral or inactive position.

I claim:

1. In a controllable pitch propeller, a hub, a blade mounted on the hub enabling blade pitch adjustment, a hydraulic servomotor connected to the blade to effect such adjustment, normal pitch limiting abutments connected with the servomotor and turned thereby when adjusting the blade, a hydraulically releasable latch adapted to be positioned between said abutments and to clear the same when released for enable pitch adjustment beyond a normal range, separate pumping systems rotatable with the propeller and connected respectively hydraulically with the pitch adjusting servomotor and releasable latch, controllable mechanism to actuate the pumps, and relief valves in both pumping systems to limit the amount of pressure which may be delivered to the servomotor and latch by the pumping systems.

2. In a variable pitch propeller, hydraulic mechanism rotatable with the propeller to adjust blade pitch in opposite directions during flight, separate pumping means rotatable with the propeller for actuating the hydraulic means in respective directions, hydraulically acting control means non-rotatable with the propeller for initiating operation of the pumping means, said control means comprising two control pumps and respective servomotors and means associated therewith enabling the servomotors individually to actuate the pumping means of the propeller, a cam for operating both control pumps, each of said control pumps having a return spring operable to return the cam to an initial non-operating position.

GORDON W. HARDY.

REFERENCES CITED

The following references are of record in the file of this patent:

UNITED STATES PATENTS

| Number | Name | Date |
|---|---|---|
| 1,851,874 | Seppeler | Mar. 29, 1932 |
| 2,023,785 | Hoover | Dec. 10, 1935 |
| 2,276,347 | Ruths et al. | Mar. 17, 1942 |
| 2,307,102 | Blanchard et al. | Jan. 5, 1943 |
| 2,320,195 | Rindfleisch et al. | May 25, 1943 |
| 2,343,416 | Keller | Mar. 7, 1944 |
| 2,352,336 | Martin et al. | June 27, 1944 |
| 2,357,400 | Haines | Sept. 5, 1944 |
| 2,404,290 | Hoover | July 16, 1946 |
| 2,417,870 | Haines | Mar. 25, 1947 |
| 2,433,990 | Hardy | Jan. 6, 1948 |
| 2,491,375 | Hardy | Dec. 13, 1949 |

FOREIGN PATENTS

| Number | Country | Date |
|---|---|---|
| 480,747 | Great Britain | Feb. 25, 1938 |
| 497,999 | Great Britain | Jan. 2, 1939 |
| 559,361 | Great Britain | Feb. 16, 1944 |
| 635,992 | Germany | Sept. 30, 1936 |
| 797,873 | France | Feb. 24, 1936 |